United States Patent
Anderson (10) Patent No.: US 6,251,166 B1
(45) Date of Patent: Jun. 26, 2001

(54) GLYCOL REGENERATION SYSTEM HAVING A PRESSURIZED REBOILER TO REMOVE BTEX COMPOUNDS

(75) Inventor: R. David Anderson, Wichita Falls, TX (US)

(73) Assignee: Anderson Controls, LC, Wichita Falls, TX (US)

( * ) Notice: Subject to any disclaimer, the term of this patent is extended or adjusted under 35 U.S.C. 154(b) by 0 days.

(21) Appl. No.: 09/376,890

(22) Filed: Aug. 18, 1999

(51) Int. Cl.$^7$ .................................................... B01D 53/14
(52) U.S. Cl. ................................ 95/166; 95/174; 95/178; 95/193; 95/194; 95/209; 95/231; 203/18; 203/71
(58) Field of Search .............................. 95/161, 165, 166, 95/173, 174, 178, 179, 180, 193, 194, 209, 231; 202/186; 203/18, 71

(56) References Cited

U.S. PATENT DOCUMENTS

| | | | |
|---|---|---|---|
| 3,104,958 | * 9/1963 | Smith et al. | 95/169 |
| 3,182,434 | * 5/1965 | Fryer | 95/161 |
| 4,010,009 | * 3/1977 | Moyer | 95/194 |
| 4,010,065 | * 3/1977 | Alleman | 95/169 |
| 4,375,977 | 3/1983 | Honerkamp et al. | 55/234 |
| 4,432,779 | 2/1984 | Honerkamp et al. | 55/233 |
| 4,455,157 | 6/1984 | Honerkamp et al. | 55/234 |
| 4,753,664 | 6/1988 | Honerkamp et al. | 55/174 |
| 5,084,074 | * 1/1992 | Beer et al. | 95/193 |
| 5,141,536 | 8/1992 | Schievelbein et al. | 55/208 |
| 5,163,981 | * 11/1992 | Choi | 95/209 |
| 5,209,762 | * 5/1993 | Lowell | 95/231 |
| 5,234,552 | 8/1993 | McGrew et al. | 203/18 |
| 5,346,537 | * 9/1994 | Lowell | 95/161 |
| 5,453,114 | 9/1995 | Ebeling | 95/166 |
| 5,490,873 | 2/1996 | Behrens et al. | 96/160 |
| 5,520,723 | 5/1996 | Jones, Jr. | 95/161 |
| 5,536,303 | 7/1996 | Ebeling | 95/166 |
| 5,643,421 | * 7/1997 | Smith | 95/209 |
| 5,733,471 | 3/1998 | Foral | 203/18 |
| 5,766,313 | * 6/1998 | Heath | 95/161 |
| 5,882,486 | * 3/1999 | Moore, Jr. | 95/209 |
| 5,988,283 | * 11/1999 | Gann | 95/193 |
| 6,004,380 | * 12/1999 | Landreau et al. | 95/194 |

* cited by examiner

Primary Examiner—Duane S. Smith
(74) Attorney, Agent, or Firm—Charles D. Gunter, Jr.

(57) ABSTRACT

A glycol regenerating system wherein a pressurized reboiler is introduced to a typical prior art system, the pressurized reboiler being in the glycol stream upstream from the conventional atmospheric reboiler. The pressurized reboiler heats the rich glycol coming from the glycol contactor from about 300° F. to 400° F. and keeps the glycol under pressure from about 10–25 psig. in order to first distill and condense VOCs (volatile organic compounds) which constitute non-condensable hydrocarbons and condensable hydrocarbons such as BTEX (Benzene, Toluene, Ethylbenzene, Xylene) compounds, the components being conveniently under pressure for transporting the components to a desired location.

12 Claims, 8 Drawing Sheets

GLYCOL REGENERATION SYSTEM HAVING A PRESSURIZED REBOILER TO REMOVE BTEX COMPOUNDS

BACKGROUND OF THE INVENTION

1. Field of the Invention

The present invention relates to the purification of natural gas, and in particular to glycol regeneration systems for the removal of undesirable organic compounds from glycol used in the dehydration of natural gas.

2. Description of the Prior Art

Natural gas obtained from wells typically contains water vapor along with other hydrocarbons which are considered impurities of the natural gas. These impurities, particularly water, can cause many problems in pipeline and processing equipment. For this reason, it has long been a common practice to treat the natural gas near or at the well head to remove these impurities. Removing water vapor and other hydrocarbons helps to prevent clogging of the pipeline with liquid water or hydrocarbons, and also helps prevent corrosion of the pipelines.

The most commonly used method of removing water from the natural gas is through glycol dehydration. The glycol is expensive, so it is advantageous to recycle (regenerate) it for further use. Removing the water in the glycol typically entails heating the glycol to between 350° F. and 400° F. at atmospheric pressure. This vaporizes the water to leave a pure stream of glycol for reuse. However, other hydrocarbon impurities are also removed from the glycol, and simply heating the glycol in a traditional atmospheric pressure reboiler also vaporizes those hydrocarbons, which are thus released into the atmosphere. This presents an environmental problem.

Recent developments in environmental regulations reflect a concern for the detrimental effects of aromatic hydrocarbon emissions on the atmosphere. This increased concern has led the gas industry to look for new ways to reduce and control hydrocarbon emissions, including emissions of benzene, toluene, elthylbenzene, and xylene ("BTEX"), from glycol dehydrators. The EPA estimates that there are approximately 40,000 glycol dehydration units in the U.S. that account for about 88% of the total BTEX emissions for the oil and gas industry. The control of BTEX emissions is one of the largest environmental challenges facing the U.S. natural gas industry.

The typical natural gas glycol dehydration process transfers water from the gas to a liquid stream of glycol and simultaneously removes a small portion of the BTEX and other volatile organic compounds. During the regeneration of the glycol, the water (in the form of steam) and the absorbed hydrocarbons are emitted to the atmosphere or further processed through an emissions control technology.

Of the industry producers that are employing BTEX control technology, about 80% use a vapor recovery system ("VRS") to control emissions. The other 20% employ flare or incineration systems to destroy all organic compounds vented from the glycol purifier. A VRS consists of the condensation of water and heavy hydrocarbons using either air, water, or glycol as the cooling agent, followed by three phase separation. Most of the systems employ an atmospheric reboiler, where the pressure within the system is reduced to atmospheric pressure and the rich glycol is heated to 350° F. to 400° F., and the resulting gas is condensed to remove the water and BTEX. The products of separation are condensable hydrocarbons, water in its liquid form, and non-condensable gases. Because separation occurs at atmospheric pressure, all three phases must be pumped or compressed to storage tanks and the gas system. The incineration systems have high operating costs and do not recover any hydrocarbons for sales.

Often, some of the non-condensable hydrocarbon gasses in the glycol stream are released while still under pressure—before being boiled off under heat and at atmospheric pressure. This is often accomplished in the flash tank. However, the glycol is not heated, or heated only slightly. Given that the boiling points of compounds will increase while under pressure, the temperature is not enough to remove BTEX, nor is any attempt made to remove BTEX gasses at the flash tank.

An alternate method of removing BTEX from glycol is a process called R-BTEX. The R-BTEX system and all VRS systems involve the condensing of the water stream coming from the dehydration unit and then separating the components at atmospheric pressure. This methodology has two significant flaws. One is the expense of condensing the steam into it liquid state. The other is the problem of pressurizing the separated components for transfer to their appropriate locations.

More recent methods of separating BTEX and non-condensable hydrocarbons from glycol is by the use of a stripping gas with gas bubble-caps located within a stripper vessel under pressure. (U.S. Pat. No. 5,536,303). Problems with this system include the initial cost of the complex array of bubble caps themselves, the inability of the system to recover and thus use the BTEX and other components that are carried off by the stripping gas, and the stripping gas required is often more than can be used as fuel, the excess being flared which adds to waste of material. Thus, there is a need for an improved means of removing BTEX compounds from glycol used in natural gas production.

SUMMARY OF THE INVENTION

One object of the present invention is to provide a means of conserving the gas and liquid pressure generated at the glycol contactor in order to use the pressure to transport separated by-products such as volatile organic compounds ("VOCs"), of which BTEXs are included, from the glycol.

Another object of the present invention is to provide a means of retrofitting a traditional glycol regeneration system with a pressurized reboiler of the present invention.

Yet another object of the present invention is to provide a method of removing at least 95% of the BTEX compounds from the glycol before it enters the atmospheric reboiler.

The objects of the present invention are achieved by a novel method of regenerating glycol used in dehydrating a natural gas stream containing VOCs. Generally, VOCs can be divided into two classes: non-condensable and condensable hydrocarbons. BTEX compounds fall under the class of condensable hydrocarbons and are of primary concern for removal from the glycol. The method of the invention comprises first passing the natural gas stream against flowing glycol in an absorber vessel so that the glycol absorbs water and hydrocarbons from the gas stream, thus resulting in a first mixture of glycol, water and VOCs in the vessel as well as a dehydrated gas stream exiting the vessel. Next, the first mixture is removed from the absorber vessel and conducted into a pressurized reboiler. The pressurized reboiler is heated to between about 300° F. to 400° F. and at a pressure of between about 10 psig. and 25 psig., thus separating glycol from the VOCs to form a vapor phase hydrocarbon and water mixture and a second mixture of glycol and water which is substantially free of hydrocarbons. Next, the vapor phase hydrocarbon and water mixture is condensed and conducted to a gas-liquid-phase separator to separate the condensable and non-condensable hydrocarbons, and water from one another. Finally, the second mixture of glycol and water is conducted to an atmospheric reboiler vessel to remove the remaining water in the glycol, thus producing glycol that is nearly water and VOC free.

Additional objects, features and advantages will be apparent in the written description which follows.

DETAILED DESCRIPTION OF THE INVENTION

The invention will first be described with reference to the most common prior art glycol regenerator 10 and method of regenerating glycol depicted in FIG. 1 without reference to the apparatus 11 of the invention. A description of the prior art method of glycol regeneration wherein primarily water is removed from the glycol will help to better understand the current invention.

It is well know in the petroleum industry that water vapor and entrained aromatic hydrocarbons such as benzene can be extracted from a natural gas stream by subjecting the gas to a desiccant. Typically used desiccants are diethylene glycol, triethylene glycol or mixtures thereof. There may also be some diglycol amine. The invention will work with any of these desiccants or similar class of glycol desiccants, hereinafter referred to by the general term "glycol".

Glycol is used to extract water from natural gas by bringing the two substances into direct contact. Contactor chamber 13 is an apparatus that provides the environment wherein upwardly flowing gas intimately contacts downwardly migrating or flowing liquid desiccant. The techniques for employing glycol absorbers is described in detail in U.S. Pat. Nos. 5,116,393, 4,375,977, and 4,661,130, incorporated herein by reference. In common prior art devices, natural gas flows into contactor chamber 13 through inlet 15 located near the bottom of the contactor chamber 13, the chamber and components downstream of the chamber being held under pressure. The arrows imbedded within the schematic lines in FIG. 1 represent fluid flow to and from the contactor 13 and other parts of the apparatus 11.

After entering into inlet 15, the gas then rises to the top and exits at outlet 17. Simultaneously, fresh glycol flows down the contactor 13 by entering the top at inlet 19 and flowing by force of gravity towards the bottom to exit at outlet 21. The contactor chamber 13 is kept under pressure, and the level of the liquid is kept constant by the control valve 151 and associated level control 153. The glycol may be agitated in its flow by an agitating or flow-diversion means such as alternately placed bubble-trays 18. This helps to increase the contact between the fresh glycol and the natural gas stream.

Natural gas is typically about 76% methane, 6–7% ethane, and 3–4% propane. The natural gas that flows into inlet 15 typically contains water and hydrocarbons of an undesirable nature, especially aromatic compounds such as benzene, toluene, ethyl benzene, and xylene, or "BTEX" compounds. These are referred to as the condensable hydrocarbon component of VOCs. The natural gas that flows into inlet 15 also contains condensable hydrocarbon VOCs of a smaller molecular weight such as hexane and cyclohexane that are desirable for many commercial uses once separated from the natural gas. The natural gas flowing from the contactor 13 through outlet 17 should be relatively free of these non-condensable and condensable hydrocarbons and water, the glycol flowing out from outlet 21 containing the extracted contaminants. The remainder of the glycol regeneration system 10 is devoted to removing the undesirable contaminants from the glycol so that the glycol can be reused.

The impure glycol from outlet 21 flows first to a reflux coil 27 within still tower 23. The reflux coil 27 allows relatively cool glycol to pass through the still tower 23 to slightly cool the vapors within the still and condensing glycol vapor that would otherwise escape into the air. Since the impure glycol from outlet 21 is relatively cool, it is used to withdraw heat from the heated glycol in atmospheric reboiler 25, described further infra. The impure glycol is thus nominally heated, flowing to flash tank 29 and out through outlet 47. The flash tank is used to release some of the non-condensable hydrocarbon gasses in the glycol stream before flowing further downstream. Control valve 31 controls the pressure of the glycol coming from the flash tank 29, and control valve 155 with its associated level control 157 control the level of fluid within the flash tank.

The impure glycol then flows from the control valve 155 to heat exchanger 33. The heat exchanger 33 withdraws heat from the hot glycol coming from the reboiler (described infra) so that it will extract water more efficiently from the natural gas once in the contactor 13. From heat exchanger 33 the impure glycol flows to the still tower 23 at inlet 35, the liquid then flowing into the atmospheric reboiler 25 to be heated. The reboiler 25 typically heats the glycol under normal atmospheric pressure (14.7 psia.) from about 350° F. to 400° F. Under these conditions, the water, and VOCs (both condensable and non-condensable) are vaporized, escaping from the tower outlet 49 to be either vented to the atmosphere, burned, or reprocessed in some manner. The resultant glycol stream is a regenerated, fresh stream of glycol flowing from outlet 37 to the surge tank 39, to be pumped by pump 41 through outlet 43 and back to the contactor chamber 13, thus completing the regenerative cycle of the apparatus.

Referring again to FIG. 1, the apparatus 11 of the present invention is shown. The apparatus 11 is located within the glycol stream prior to the glycol entering the atmospheric reboiler 25. Thus, the apparatus 11 and the method of purifying glycol of the present invention involves the new procedure prior to the glycol being treated in the atmospheric reboiler 25, thus not eliminating the need for the other components of the prior art regenerator 10 described supra.

Figure 2:
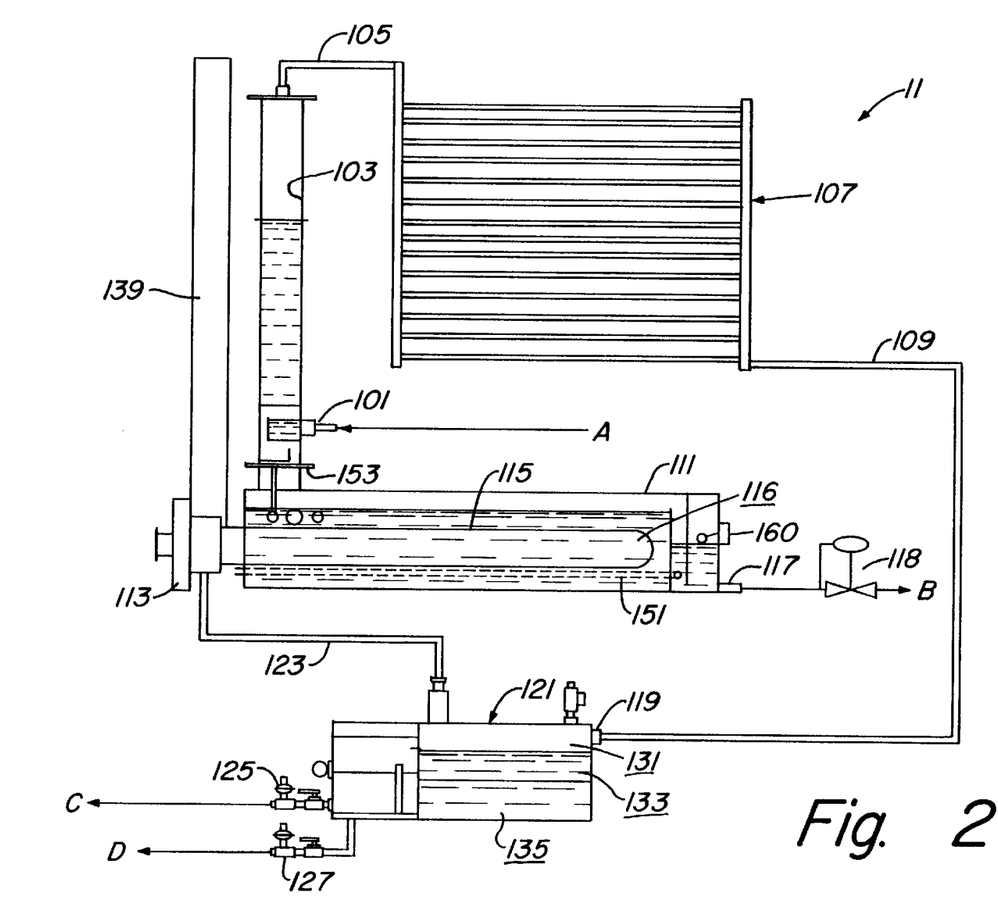
FIG. 2 is a schematic of the pressurized reboiler of the invention.
Figure 3:
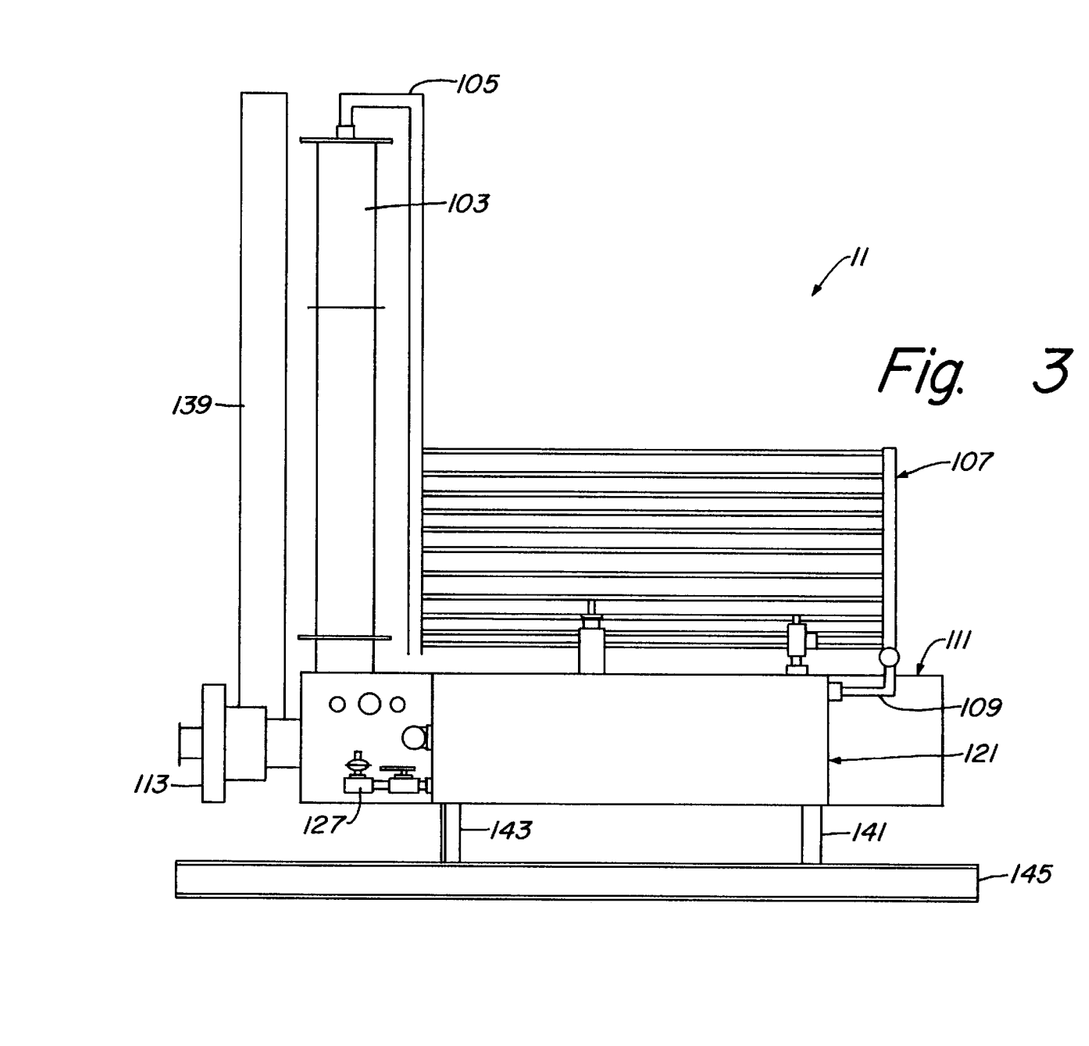
FIG. 3 is a side view of the pressurized reboiler of the invention.
Figure 4:
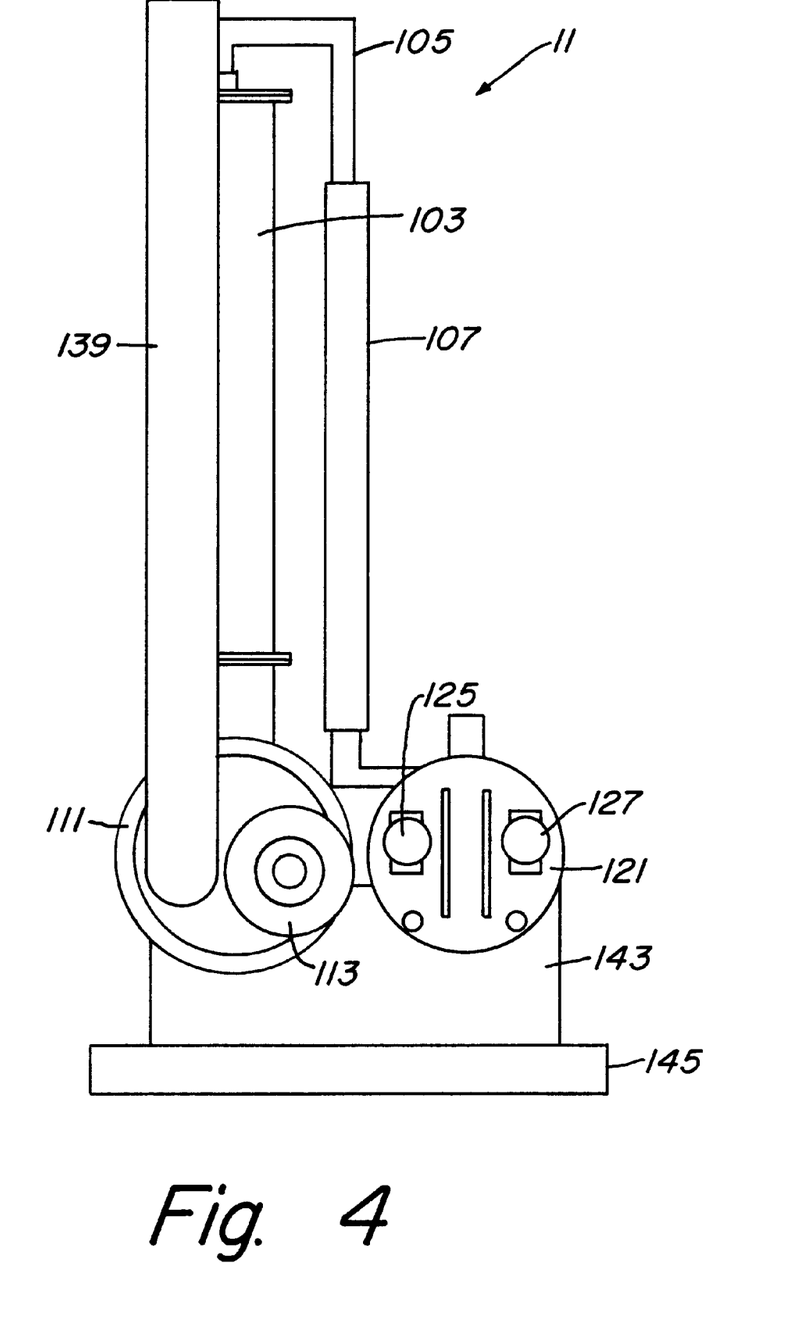
FIG. 4 is a front view of the pressurized reboiler of the invention.

The apparatus 11 is described with reference to FIGS. 2, 3 and 4, wherein apparatus 11 used to carry out the new method of removing condensable (e.g., BTEX) and non-condensable hydrocarbons from glycol. Apparatus 11 is supported by support members 141, 143, and 145 as shown in FIGS. 3 and 4. The apparatus 11 can be inserted into a typical glycol regeneration systems relatively easily since the other components of the regeneration system 10 are still required for the invention. Thus, expensive retrofitting of the system is not required for the present invention.

The flow of the liquid and gaseous components is represented by lettered arrows. Impure (rich) glycol represented by the arrow A first flows into the still inlet 101 under high pressure generated at the contactor chamber 13. The still tower 103 and pressurized reboiler tank 111 are designed such that the glycol can be kept at a pressure between about 10 psig. and 25 psig. (greater than 1 atmosphere of pressure) when inside the apparatus. The glycol enters the still at an elevated temperature due to having passed through coil 27 within the atmospheric reboiler condenser tower 23 and heat exchanger 33. The heater 113 also further heats the glycol if necessary through the gas-powered heating coil 115 within the reboiler 111. Stack 139 vents burned gasses in heater 113. The temperature is maintained between about 300° F. and 400° F. in the pressurized reboiler tank 111, which generates hot gases within the interior 116. This temperature is adequate at an elevated pressure to vaporize the condensable and non-condensable hydrocarbons within the glycol, as well as some water.

Glycol tends to decompose at temperatures above 400° F. under atmospheric pressure. Thus, the temperature must be kept below that level. When heated to 300 to 400° F., the hydrocarbons, and in addition, some water is advantageously removed. The glycol within the reboiler thus becomes purified, as fresh (lean) glycol with nearly all contaminants removed. A sensor 153 is located in still tower 103 and extends into pressurized reboiler tank 111. Stream B is withdrawn from outlet 117, which leads to the atmospheric reboiler 25 to further remove the water. Outlet 117 is fitted with control valve 160 with associated liquid level control 118 to maintain the liquid level within the pressurized reboiler.

The result of passing the impure glycol through the pressurized reboiler is a vast reduction in BTEX and other compounds. For example, the glycol coming from the contactor may have a weight percentage of 0.00468 of benzene relative to the entire composition which is 94.9% glycol. The lean or purified glycol, at a pressurized reboiler pressure of 14.0 psig. and a temperature of 350° F., has a weight percent of 0.000232 of benzene in stream B relative to the entire composition which is 99.0% pure glycol. Thus, about 95% of the benzene is removed from the rich glycol, the lean glycol from stream B having only about 5% of the benzene that was in stream A using the pressurized reboiler.

Table 1 and Table 2 present a breakdown of the various components in a typical test stream of glycol. The flow rate of the stream of spent glycol in Table 1 is 35.6 MMSCF/day at 289 psig. The flow rate of the stream of lean glycol in Table 2 is 3.46 gpm. The data in Tables 1 and 2 show that the glycol/water mixture in stream B is at least 99% free of hydrocarbon contaminants after passing through the apparatus 11 and atmospheric reboiler. For a typical natural gas plant, this amounts to an emission of BTEX gases of under 1 ton/year. Table 3 presents a breakdown of the various BTEX components and their respective emissions per hour and per year.

Figure 5:
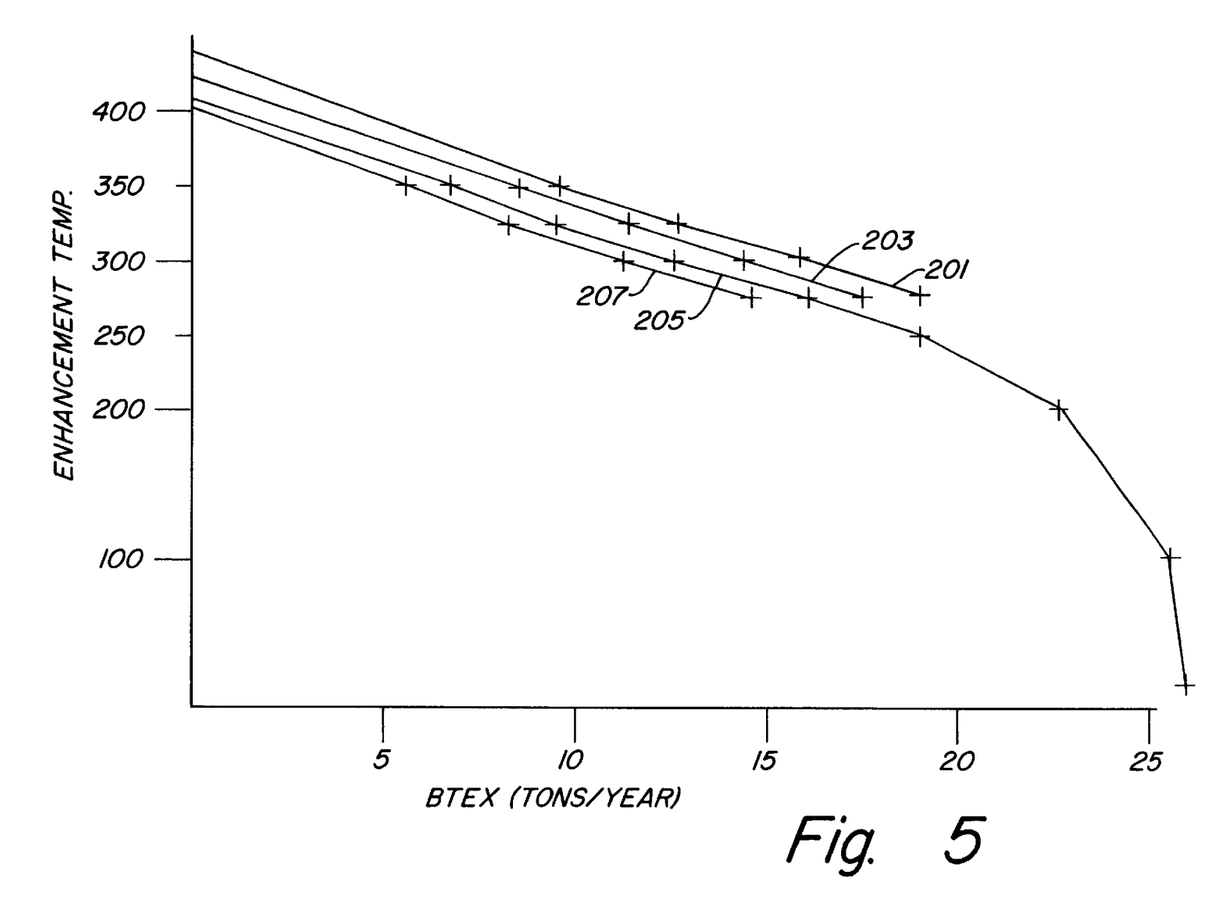
FIG. 5 is a graph of the rate of recovery of BTEX as a function of temperature of the reboiler of the invention at various pressures.
Figure 6:
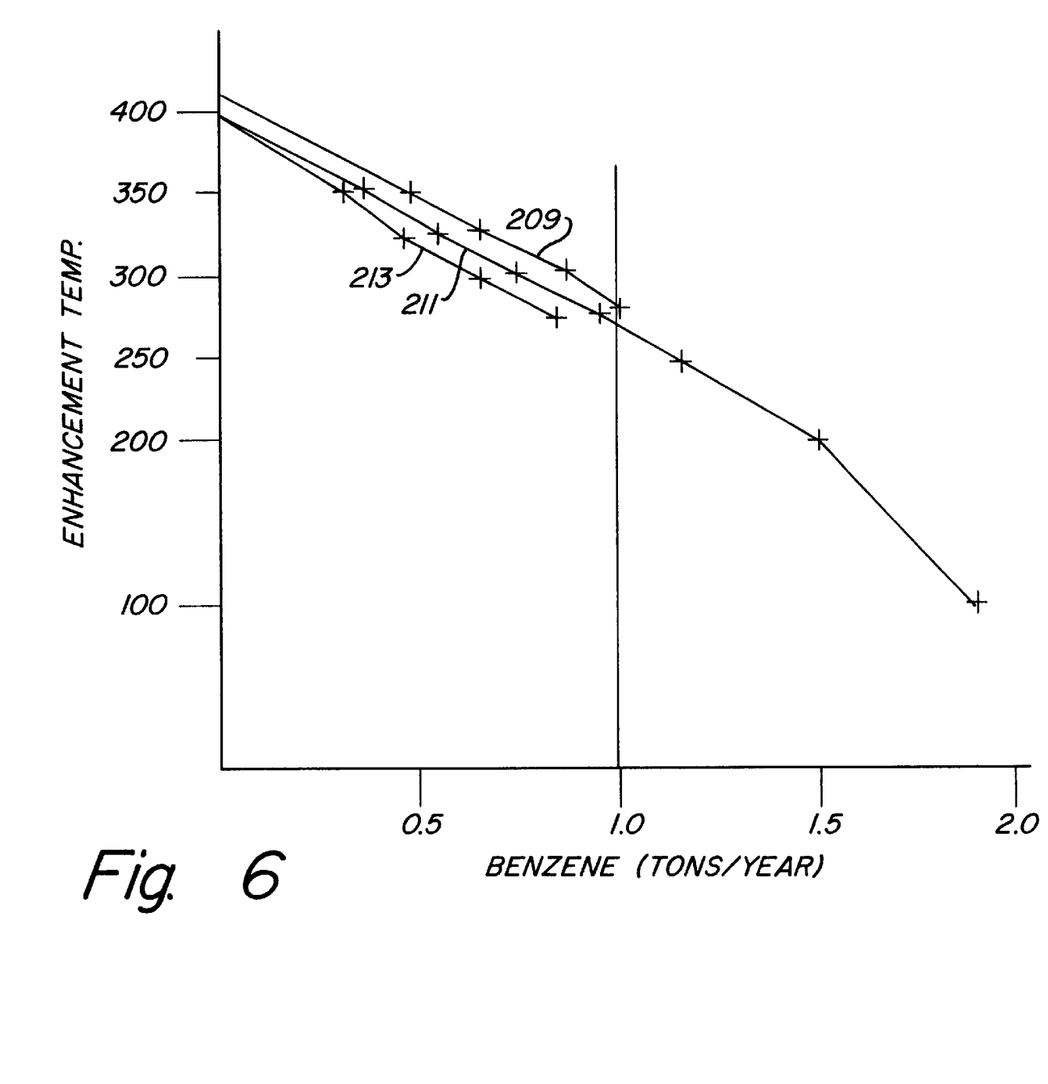
FIG. 6 is a graph of the rate of recovery of benzene as a function of temperature of the reboiler of the invention at various pressures.

The enhancement recovery (or reduction of emission) of VOCS, and in particular BTEX compounds, using the pressurized reboiler 11 of the invention is shown graphically in FIG. 5. Also, the enhancement recovery of benzene is shown graphically in FIG. 6. Both graphs show the dependency of recovery on the temperature in the pressurized reboiler and the pressure on the system. In FIG. 5, the data in line 201 is at a pressure of 25 psig.; line 203 is at 20 psig.; line 205 is at 14 psig.; and line 207 is at 10 psig. In FIG. 6, the data in line 209 is at 20 psig.; line 211 is at 14 psig.; and line 213 is at 10 psig. The data show that at higher pressure, the temperature to achieve the same recovery increases. However, at the optimum pressure of 14 psig., less than 1 ton of benzene is emitted (not recovered) per year at a temperature of just 300° F. as shown in FIG. 6. By raising the temperature 50° F., about a half a ton per year of benzene is emitted. These data show that the pressurized reboiler of the present invention is highly efficient in removing BTEX compounds from the glycol stream before the stream enters the conventional atmospheric reboiler.

TABLE 1

Spent Glycol from Contactor

| Component | Conc. (wt %) | Loading (lb/hr) |
|---|---|---|
| liquid: | | |
| TEG | 94.9 | 193 |
| Water | 3.51 | 71.5 |
| Carbon Dioxide | 0.257 | 5.23 |
| Nitrogen | 0.0743 | 1.51 |
| Methane | 0.776 | 15.8 |
| vapor: | | |
| Ethane | 0.0249 | 0.506 |
| Propane | 0.0128 | 0.260 |
| Butanes | 0.00709 | 0.144 |
| Water | 1.75 | 34.3 |
| Carbon Dioxide | 0.00632 | 0.124 |
| Nitrogen | 0.00129 | 0.0252 |
| Methane | 0.00339 | 0.0666 |
| liquid: | | |
| Ethane | $3.38 \times 10^{-4}$ | 0.00663 |
| Propane | $1.35 \times 10^{-4}$ | 0.00266 |
| Butanes | $1.15 \times 10^{-4}$ | 0.00226 |
| Pentanes | $6.78 \times 10^{-4}$ | 0.0133 |
| n-Hexane | $2.57 \times 10^{-4}$ | 0.00505 |
| Other Hexanes | 0.00391 | 0.0767 |
| Heptanes | $8.94 \times 10^{-4}$ | 0.0175 |
| 2,2,4-Trimethylpentane | $6.79 \times 10^{-4}$ | 0.0133 |
| Benzene | 0.00468 | 0.0918 |
| Toluene | 0.0260 | 0.511 |
| Ethylbenzene | 0.00205 | 0.0403 |
| Xylenes | 0.0499 | 0.978 |
| C8+ Heavies | $6.14 \times 10^{-6}$ | $1.20 \times 10^{-4}$ |
| Total Components | 100 | 1960 |

TABLE 2

Lean Glycol

| Component | Conc. (wt %) | Loading (lb/hr) |
|---|---|---|
| TEG | 99.0 | 1930 |
| Water | 1.00 | 19.5 |

TABLE 2-continued

Lean Glycol

| Component | Conc. (wt %) | Loading (lb/hr) |
|---|---|---|
| Pentanes | $1.79 \times 10^{-4}$ | 0.00350 |
| n-Hexane | $6.04 \times 10^{-5}$ | 0.00118 |
| Other Hexanes | $4.38 \times 10^{-4}$ | 0.00854 |
| Heptanes | $1.92 \times 10^{-4}$ | 0.00374 |
| 2,2,4-Trimethylpentane | $1.48 \times 10^{-4}$ | 0.00289 |
| Benzene | $2.32 \times 10^{-4}$ | 0.00452 |
| Toluene | 0.00115 | 0.0225 |
| Ethylbenzene | $7.89 \times 10^{-5}$ | 0.00154 |
| Xylenes | 0.00160 | 0.0312 |
| Total Components | 100 | 0.00195 |

TABLE 3

Uncontrolled Regenerator Emissions

| Component | Emissions lbs/hr | lbs/day | tons/yr |
|---|---|---|---|
| Methane | 0.0666 | 1.598 | 0.2917 |
| Ethane | 0.0066 | 0.159 | 0.0290 |
| Propane | 0.0027 | 0.064 | 0.0116 |
| Butanes | 0.0023 | 0.054 | 0.0099 |
| Pentanes | 0.0098 | 0.235 | 0.0429 |
| n-Hexane | 0.0039 | 0.093 | 0.0170 |
| Other Hexanes | 0.0681 | 1.635 | 0.2984 |
| Heptanes | 0.0138 | 0.331 | 0.0604 |
| 2,2,4-Trimethylpentane | 0.0104 | 0.250 | 0.0457 |
| Benzene | 0.0872 | 2.094 | 0.3821 |
| Toluene | 0.4883 | 11.719 | 2.1388 |
| Ethylbenzene | 0.0388 | 0.930 | 0.1697 |
| Xylenes | 0.9470 | 22.729 | 4.1481 |
| C8+ Heavies | 0.0001 | 0.003 | 0.0005 |
| Total Emissions | 1.7456 | 41.895 | 7.6458 |
| Total Hydrocarbon Emissions | 1.7456 | 41.895 | 7.6458 |
| Total VOC Emissions[#] | 1.6724 | 40.138 | 7.3251 |
| Total HAP Emissions[*] | 1.5756 | 37.815 | 6.9013 |
| Total BTEX Emissions | 1.5613 | 37.472 | 6.8387 |

[#]VOC = volatile organic compounds
[*]HAP = hazardous air pollutants

Referring back to FIG. 2, the condensable and non-condensable hydrocarbons and some water vapor flow into the still and through outlet 105 to be condensed in air cooled condenser 107. The condensed and largely liquified mixture flows through tube 109 to enter the three-phase separator (gas-water insoluble liquid-water) 121 at inlet 119. The three-phase separator is kept under the same pressure as the pressurized reboiler 111 and apparatus 11. The substances within the separator 121 separate into three distinct phases: a gas phase 131 of non-condensable hydrocarbons, an organic phase 133 of condensable hydrocarbons, and water 135.

The non-condensable hydrocarbon phase 131 can be vented through tube 123 back to the heater 113 of the reboiler 111 to supply the gas necessary to power the heater 113. The condensable or BTEX phase 133 is vented from valve 125 to form stream C be stored for sale or other use. The back pressure kept within the system of apparatus 11 allows the stream C to be transported easily through lines or pipes to a desired destination. The water phase 135 is vented from valve 127 to form stream D for proper disposal. The back pressure on the system also allows for the easy transport of stream D. Thus, the pressure in the contactor is conserved in the present invention.

Figure 1:
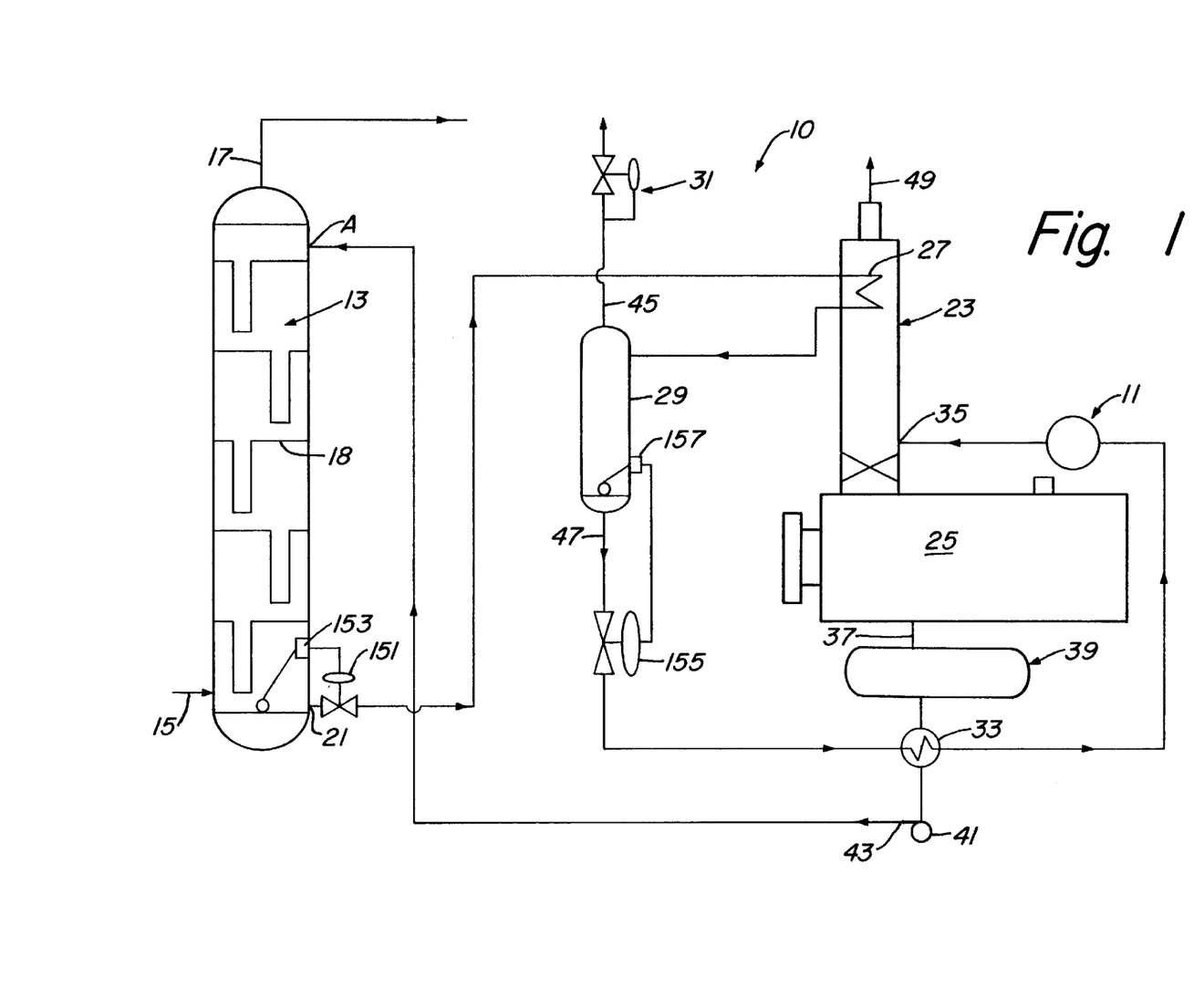
FIG. 1 is a schematic flow diagram of a glycol regeneration system; but showing the apparatus of the invention installed upstream of the still tower.

As mentioned supra in reference to FIG. 1, the fresh glycol from the pressurized reboiler (stream B in FIG. 2) enters the atmospheric reboiler 23 through still inlet 35. Since the glycol at this point is already between about 350° F. and 400° F., it need only be heated minimally if at all to further boil away the remaining water in the glycol. Thus, the energy required to heat the glycol in the pressurized reboiler 11 is conserved.

Figure 7:
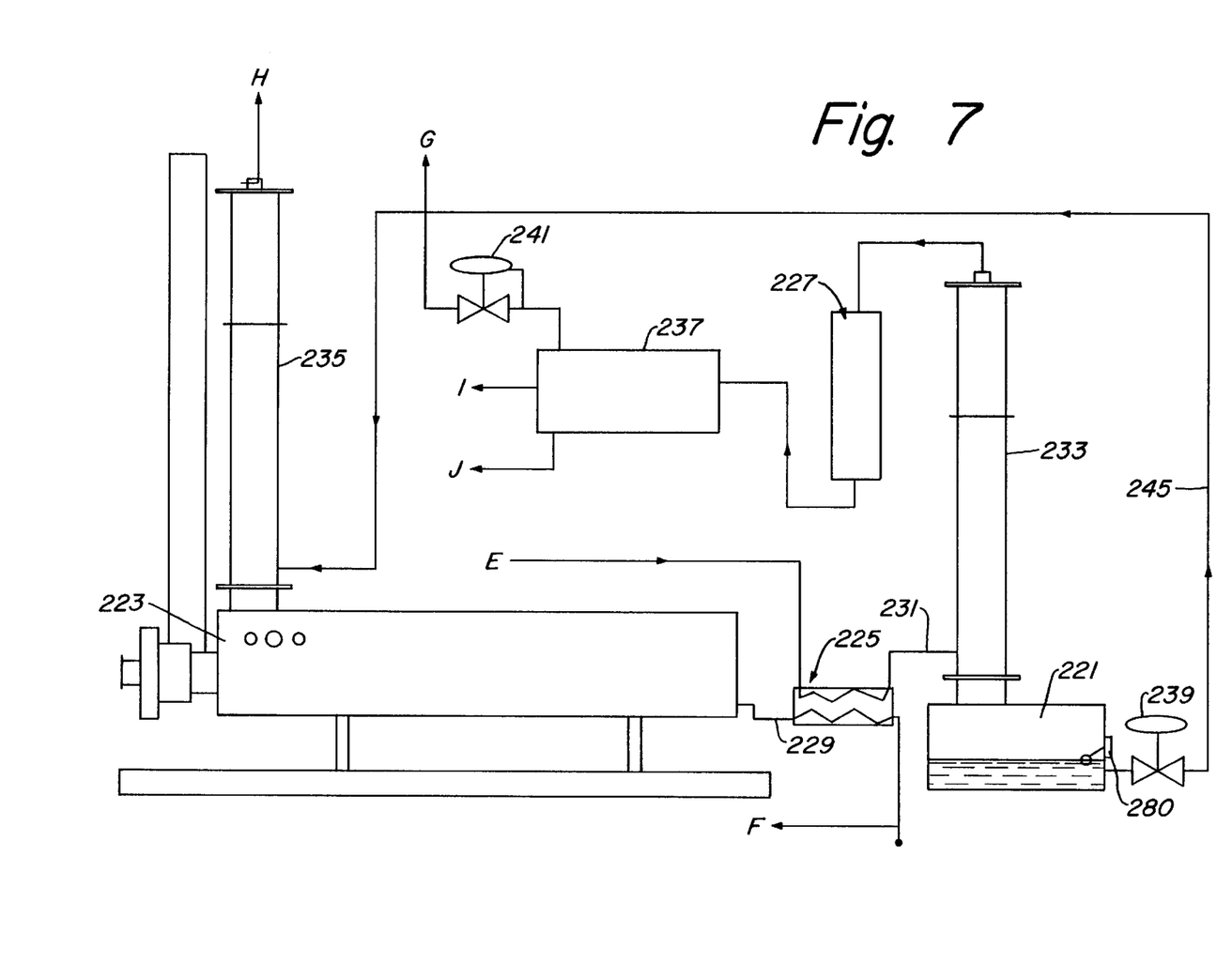
FIG. 7 is a schematic flow diagram of another embodiment of the present invention.

Many of the advantages of the embodiment described above can also be achieved in another embodiment shown in FIG. 7. In this embodiment, pressurized reboiler 221 is thermally coupled with the atmospheric reboiler 223 through a heat exchanger 225, and conduit 231. Stream E containing rich glycol from the contactor flows into the heat exchanger 225 wherein it is heated by hot, lean glycol flowing from the atmospheric reboiler 223 through line 229 and ultimately to stream F. While the glycol flowing into the pressurized reboiler 221 is only at about 350° F., this design eliminates the need for heating the pressurized reboiler 221 while still removing enough BTEX compounds so that less than 1 ton of, for example, benzene, is released per year as shown in FIG. 5.

In the embodiment shown in FIG. 7, the BTEX gases distilled in column 233 and condensed in condenser 227 flow to the three-phase separator 237. The system is kept under pressure by the addition of back pressure valve 241. Stream J thus contains water, stream I contains mostly condensable hydrocarbons such as the BTEX compounds, and stream G contains mostly non-condensable hydrocarbons that can be used to fuel the burner for the atmospheric reboiler 223. Glycol subjected to the pressurized reboiler 221 flows through line 245 to the atmospheric reboiler to still column 235, where the remaining water is vaporized and vented in stream H. The liquid level of 221 is controlled by control valve 239 and level control 280. The embodiment in FIG. 7 can be used in newly constructed glycol regenerator systems 10 or retrofitted to old systems.

Figure 8:
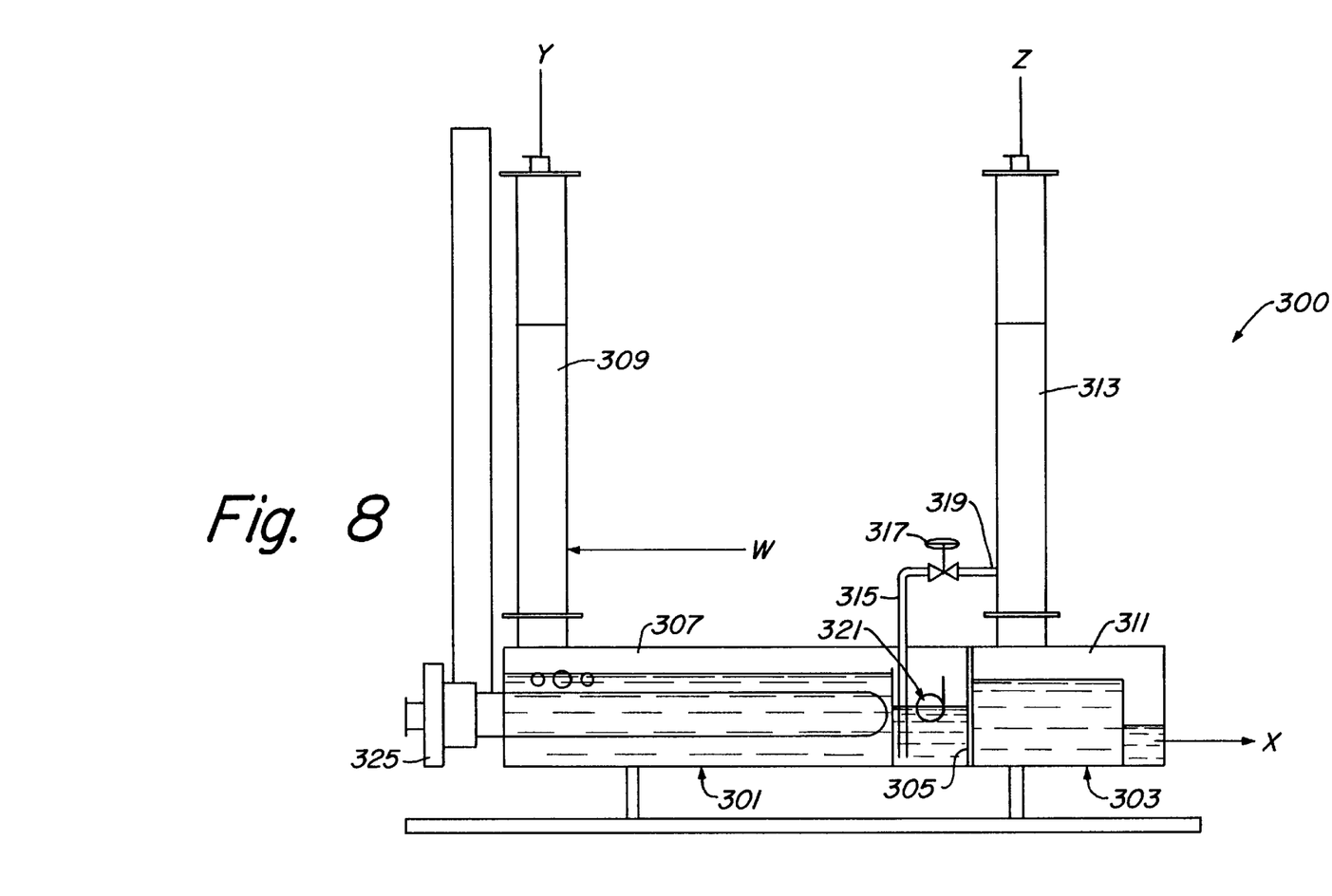
FIG. 8 is a schematic flow diagram of another embodiment of the present invention.

Yet another embodiment of the invention is described with reference to FIG. 8. This embodiment features a single unit 300 comprising both the pressurized reboiler 301 and the atmospheric reboiler 303 separated by wall 305. The atmospheric reboiler 303 includes the enclosed compartment 311. The pressurized reboiler 301 is made up of a tank 307, still tower 309, outlet 315, and control valve 317 in association with a liquid level control 321. The pressurized control reboiler 301 is kept under pressure, while the liquid glycol within is heated using the heater 325.

Rich glycol stream W flows into the unit 300 at the still tower 309, and is heated in the tank 307. Once the liquid level reaches a predetermined point, hot glycol is allowed to flow through line 315 into inlet 319 of still tower 313. Stream Y is the resultant VOC vapors and water vapor that goes to a condenser (not shown) and three-phase separator (not shown) similar to that described infra with reference to FIG. 2.

Referring back to FIG. 8, heated glycol from pressurized reboiler 301 enters the atmospheric reboiler 303 which is under atmospheric pressure. Here, the water vapor is vented to stream Z, while stream X is lean glycol with nearly all contaminants removed. The unit 300 is meant to be used primarily in new glycol regeneration systems 10, where retrofitting is not necessary.

There are several advantages to the present invention. First, the liquid components of the removed hydrocarbons could be transferred to an oil tank for sales without transporting cost such as pumps, blowcases, etc.

Another advantage is the use of the non-condensable hydrocarbons recovered from the low pressure reboiler to heat the reboiler, thus making the system self contained and cost efficient.

Because the glycol going to the atmospheric reboiler in the present invention would be well below the minimums of BTEX and VOCs allowed by the EPA, the potential for emittance would be below minimums required by most laws.

The cost of heating the pressurized reboiler of the present invention is less than the cost currently being seen to heat the atmospheric reboiler because the additional fuel the system would generate and because most of the heat used to remove the BTEX would reduce the reboiler load by preheating the glycol. Thus, the overall cost of regenerating the spent glycol would be greatly reduced.

Another advantage is the simplicity of the system. The simplicity of construction would decrease the overall cost of use and make the system more reliable and require less maintenance. The present pressurized reboiler of the invention would not require retrofitting the entire system, but only the insertion of the pressurized reboiler to the stream of glycol going to the atmospheric reboiler of present glycol regenerator systems.

While the invention has been shown in only one of its forms, it is not thus limited but is susceptible to various changes and modifications without departing from the spirit thereof.

What is claimed is:

1. A method of dehydrating a natural gas stream containing condensable and non-condensable hydrocarbons and water, the method comprising:

passing the natural gas stream against flowing glycol in an absorber vessel so that the glycol absorbs water and hydrocarbons from the gas stream, thus resulting in a first mixture stream of glycol, water, condensable and non-condensable hydrocarbons in the vessel as well as a dehydrated gas stream exiting the vessel;

passing the first mixture stream to an atmospheric reboiler in which there is produced vaporized water substantially free of condensable and non-condensable hydrocarbons and a second glycol stream substantially free of contaminants;

wherein prior to passing the first mixture stream to the atmospheric reboiler, the first stream is heated under pressure to a temperature and pressure sufficient to remove at least 95 percent of the condensable and non-condensable hydrocarbons from the stream entering the atmospheric reboiler thus producing a stream of hydrocarbons and water and a stream entering the atmospheric reboiler of water and glycol substantially free of hydrocarbons.

2. The method of claim 1, wherein the pressure is between about 10 psig. and 25 psig.

3. The method of claim 1, wherein the temperature is between about 300° F. and 400° F.

4. The method of claim 1, wherein the stream of water and hydrocarbons are fed to a three-phase separator while under pressure to separate the water phase, a condensable hydrocarbon phase, and a non-condensable hydrocarbon phase.

5. The method of claim 4, wherein the non-condensable hydrocarbon phase is fed to a heater for supplying heat to the first stream.

6. The method of claim 1, wherein prior to passing the first stream to the atmospheric reboiler, the first stream is heated under pressure, the heat being generated from a heat exchanger from heated glycol in the atmospheric reboiler.

7. The method of claim 1, wherein prior to passing the first stream to the atmospheric reboiler, the first stream is heated under pressure, the heat being generated from a heater built into a pressurized reboiler.

8. A method of dehydrating a natural gas stream containing condensable and non-condensable hydrocarbons and water, the method comprising:

passing the natural gas stream against flowing glycol in an absorber vessel so that the glycol absorbs water and hydrocarbons from the gas stream, thus resulting in a first mixture of glycol, water, condensable and non-condensable hydrocarbons in the vessel as well as a dehydrated gas stream exiting the vessel;

removing the first mixture from the absorber vessel;

conducting the first mixture into a high-pressure reboiler, wherein the reboiler is heated to between about 300° F. to 400° F. and at a pressure of between about 10 psig. and 25 psig., thus separating glycol from the condensable and non-condensable hydrocarbons to form a vapor phase hydrocarbon and water mixture and a second mixture of glycol and water which is substantially free of hydrocarbons;

condensing the vapor phase hydrocarbon and water mixture;

conducting the thus condensed vapor phase hydrocarbon and water mixture to a three-phase separator to separate the condensable hydrocarbons, non-condensable hydrocarbons, and water from one another; and conducting the second mixture to an atmospheric reboiler vessel to remove the remaining water in the glycol, thus producing water and hydrocarbon free glycol.

9. The method of claim 8, wherein a portion of the separated non-condensable organic hydrocarbons is fed to the pressurized reboiler to provide a source for heating the pressurized reboiler.

10. The method of claim 8, wherein the stream of water and hydrocarbons is fed to a three-phase separator while under pressure to separate the water phase, a condensable hydrocarbon phase, and a non-condensable hydrocarbon phase.

11. The method of claim 8, wherein the non-condensable hydrocarbon phase is fed to a heater for supplying heat to the first stream.

12. The method of claim 8, wherein the second mixture of glycol and water has at least 95% of the condensable and non-condensable hydrocarbon components removed.

* * * * *